Dec. 14, 1926.

F. E. MAYNARD

EVERSHARP DRILL

Filed Sept. 14, 1923    2 Sheets-Sheet 1

1,610,569

Frederick E. Maynard
INVENTOR.

Dec. 14, 1926.

F. E. MAYNARD

EVERSHARP DRILL

Filed Sept. 14, 1923

1,610,569

2 Sheets-Sheet

Frederick E. Maynard
INVENTOR.

Patented Dec. 14, 1926.

1,610,569

UNITED STATES PATENT OFFICE.

FREDERICK E. MAYNARD, OF LOS ANGELES, CALIFORNIA.

EVER-SHARP DRILL.

Application filed September 14, 1923. Serial No. 662,611.

This invention relates to deep well drilling tools and more particularly to rotary tools.

An object of the present invention is to provide an "eversharp" or self-sharpening toothed drill.

An object is to provide a self-sharpening toothed drill of extremely simple and substantial construction and which does not require to be pulled from the hole and resharpened.

Another object is to provide a rotary toothed drilling tool in combination with a tool joint.

An object is to provide a self-sharpening rotary tool, comprising bars of hard, stone cutting material, preferably metal, which are of such cross sectional dimensions and outline as to substantially and constantly present an effective highly efficient tooth face.

A further object is to provide a bit in which the cutting teeth are encinctured or substantially each bodily isolated in a material forming a body for the tool and which is relatively softer than the tooth forming bars.

An object is to provide an "eversharp" or self-sharpening drilling tool having teeth forming pieces which are constantly presented at the cutting end of the tool by the faster wearing away of an encincturing body substantially isolating the pieces and at the same time forming the means for holding the pieces rigidly in the body; and further an object is to provide a self-sharpening drilling tool provided with circulation passages and having a rigidly combined tool joint part.

The invention broadly consists of a tool in which there is provided a suitable number of effective cutting pieces, members or parts which are practically fully embedded in a holding body which is cast upon or in which are sunk the cutting elements and therefore forms substantially a matrix in which the cutting pieces are substantially isolated and rigidly held and will be exposed during the wearing away of the embedding body, at the cutting or end face of the body so as to provide effective projections to cut the formation.

It is to be understood that the embedding material may be varied in character as may also be the embedded cutting pieces as required according to the formation and according to the relative hardness of the embedding material and of the embedded pieces.

Other objects and advantages will be made manifest in the following specification of embodiments of the invention illustrated in the accompanying drawings, wherein.

Figures 1, 3:
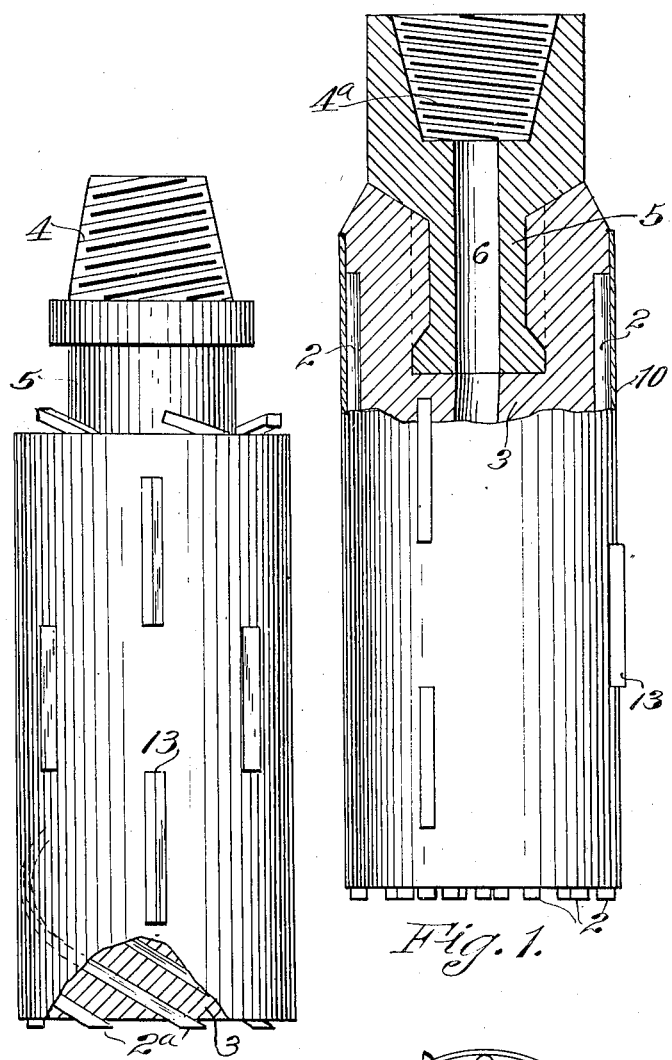
Fig. 1 is a side elevation and partial section of a preferred form of the tool.
Fig. 3 is a section of a portion of a modified form of the tool in which the cutting pieces are shown as helices of small cross section.
Figure 2:
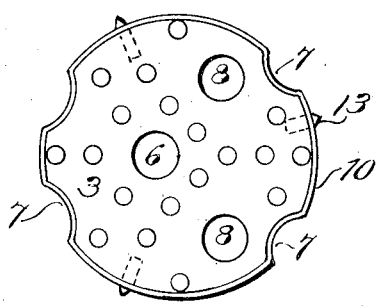
Fig. 2 is a bottom end or cutting face view of the tool, clearly showing the concentrically sweeping, isolated teeth.

In Figs. 1 and 2 a number of hard cutting bars 2 are arranged in any suitable system or disposition but preferably held permanently in wholly isolated relation by a main carrying body or stock 3 preferably of a material, whatever its character, somewhat softer than the cutting bars so that when the body 3 wears away in use under attrition at the leading end of the tool, the harder bar ends will be exposed in the form of comparatively small teeth or projections at the effective face of the tool.

The body itself may be of any suitable form and may be provided with exterior flutes 7, Fig. 2, forming water passageways, and may be provided with interior passageways 8 extending from the bottom end of the drill body to the upper shoulder and shank 5, which may have a screw-pin, Fig. 3, or a box 4ª, Fig. 1. The drill stem has a water supply hole 6 for down flow. When the drill body is fluted the passageways 8 may be omitted. The body 3 may be surrounded by a shell 10 as shown in the several figures.

Various adaptations of the invention are shown:—

Figures 4, 5, 6:
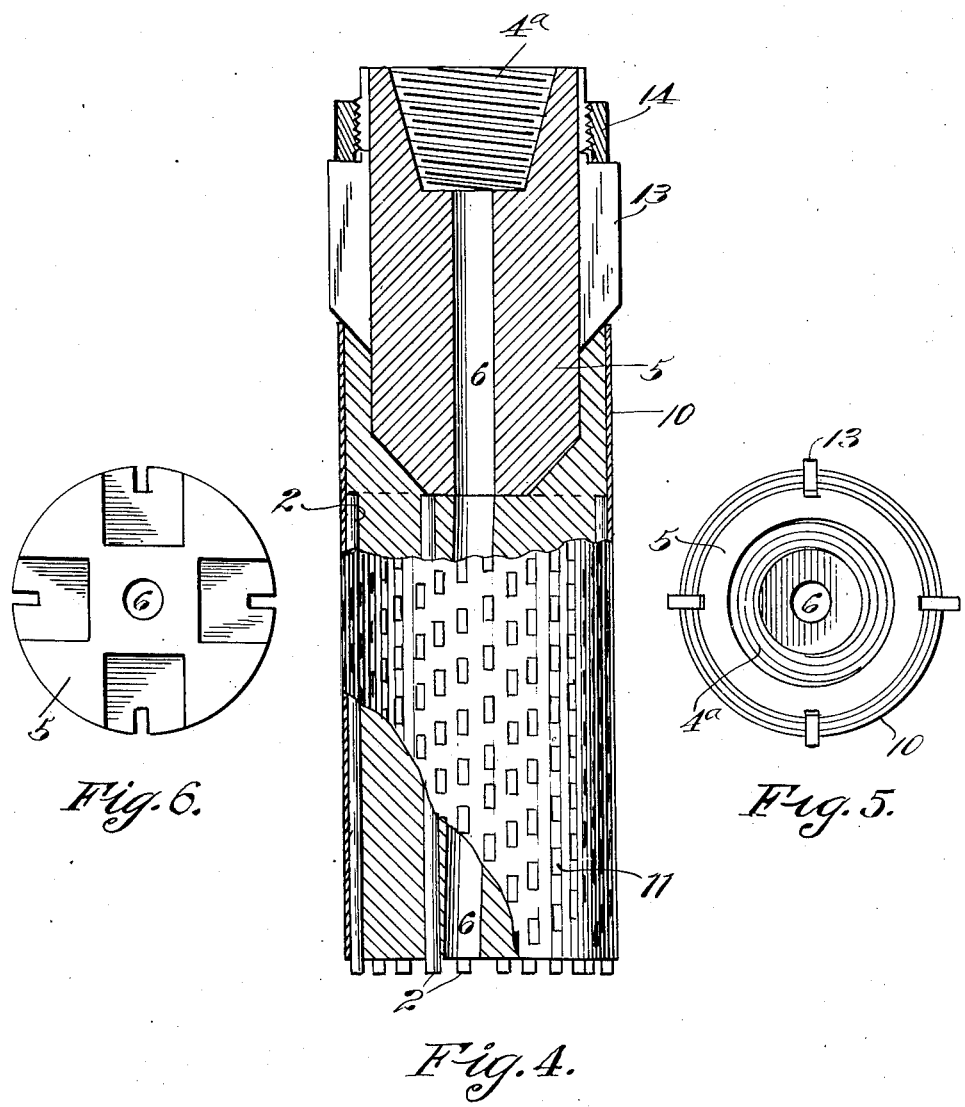
Fig. 4 is a central section and side elevation of another form of the drill.
Fig. 5 is a top end view of Fig. 4.
Fig. 6 is a bottom end view of the joint block of Fig. 4.

In Fig. 3 the small cutting-teeth bars 2ª are helices. In Figs. 4, 5 and 6 is shown a joint part 5 having inserted, longitudinal reaming means, as blades 13 held in by a clamp ring 14. The shell 10 is shrunk or driven on the part 5 and thus forms a chamber into which, when it is open end up, may be poured a body forming material to rigidly hold the tooth forming bars 2 in their isolated relation.

The fundamental concept of my invention is the combination, with a softer driving and carrying drill body, of longitudinal, small, hard, tooth-forming bars, rods or wires which are fixedly held by the body in such manner that the advance ends of the bars constantly project from the leading end of the drill body, which, being softer than the bars, wears away faster than the teeth. These, in the aggregate, have a sufficiently small area to avoid a riding action, or sliding without cutting. Each tooth is so small in end area as to have a high attrition effect when raking around on the hole bottom.

To secure maximum efficiency with a small number of teeth and to cover the entire area of the hole bottom, the teeth are so disposed as to sweep in close concentric circles when the tool is rotated. Such a concentric sweep will be accomplished by teeth relatively disposed in different radial positions, as for example in Fig. 2, which shows only one system of arrangement. There may be one tooth or more in any circle about the tool axis.

From the above it will be seen that I have provided a drill tool consisting essentially of a suitable system or disposition of a number of bars 2 of hard material or metal rigidly secured by a body having a suitable tool joint for driving and having circulation passages.

In operation, as the body 3 wears away at the drilling end, the hard bars 2 are exposed as short nogs or teeth for cutting effect and these teeth will obviously be self-sharpening by attrition. Therefore, I have provided an "ever-sharp" tool which may be used up substantially from one end to the other for the length of the tooth rods.

The tool of this invention includes a body the length of which, with the longitudinal tooth-bars, is practically unlimited and it is possible to readily make practical tools to a maximum length which is determined only by factors outside of the tool, such for instance as the strength of the parts forming the drilling string and the drilling and elevating apparatus.

The tool is devoid of moving parts and therefore is distinguished from tools having rotative cutters and discs, and therefore obviates the necessity for frequently pulling the drill string and tool from the hole merely for the purpose of lubricating parts.

The shell 10 may be perforated as at 11 so that portions of the body 3 may slightly project to form wall reaming means.

A great advantage of the present tool is that in desired cases it can be made of such length as to form its own guide to run and maintain a straight hole and not be deflected out of line as by encountered boulders and hard formations at one side of the hole.

What is claimed is:

1. An eversharp or self-sharpening, deep well drilling tool comprising an elongated drill body provided with rigidly secured cutting bars of harder material than the body and each of relatively small end area to present an efficient groove cutting nose, and which bars extend substantially full length of the body; the bars being arranged at slightly different distances from the center so as to cut grooves substantially over the whole surface of the bottom of the hole being cut.

2. A device of the character set forth in claim 1, and in which the rods are so positioned as to keep a constant radial cutting relation as to the axis of the tool.

3. A device of the character set forth in claim 1, and in which the aggregate area of the noses is insufficient to result in a sliding and polishing action.

In testimony whereof I have signed my name to this specification.

FREDERICK E. MAYNARD.